United States Patent [19]

Steigerwald et al.

[11] Patent Number: 4,642,745
[45] Date of Patent: Feb. 10, 1987

[54] POWER CIRCUIT WITH HIGH INPUT POWER FACTOR AND A REGULATED OUTPUT

[75] Inventors: Robert L. Steigerwald, Burnt Hills; William P. Kornrumpf, Albany, both of N.Y.

[73] Assignee: General Electric Company, Schenectady, N.Y.

[21] Appl. No.: 835,708

[22] Filed: Mar. 3, 1986

[51] Int. Cl.$^4$ .................................... H02M 5/458
[52] U.S. Cl. ...................................... 363/37; 363/17; 363/21; 363/26; 363/101
[58] Field of Search ............... 363/17, 21, 26, 37, 363/44, 45, 101

[56] References Cited

U.S. PATENT DOCUMENTS

| | | | |
|---|---|---|---|
| 4,017,785 | 4/1977 | Perper | 363/37 |
| 4,109,307 | 8/1978 | Knoll | 363/101 |
| 4,127,893 | 11/1978 | Goepel | 363/37 |
| 4,188,660 | 2/1980 | Knoll | 363/37 |

FOREIGN PATENT DOCUMENTS

| | | | |
|---|---|---|---|
| 220081 | 12/1984 | Japan | 363/37 |
| 2152771 | 8/1965 | United Kingdom | 363/37 |

OTHER PUBLICATIONS

Ser. No. 793,430 filed 10-31-85 by R. L. Steigerwald.

*Primary Examiner*—William H. Beha, Jr.
*Attorney, Agent, or Firm*—Marvin Snyder; James C. Davis, Jr.

[57] ABSTRACT

A single power converter is capable of drawing low distortion current from an AC line and delivering DC or AC power to a load. The single power converter is used to independently control the input current and the output current. The power converter transformer has an output winding which is controlled by pulse-width modulation (PWM) and a frequency controlled boost winding for controlling input current.

16 Claims, 7 Drawing Figures

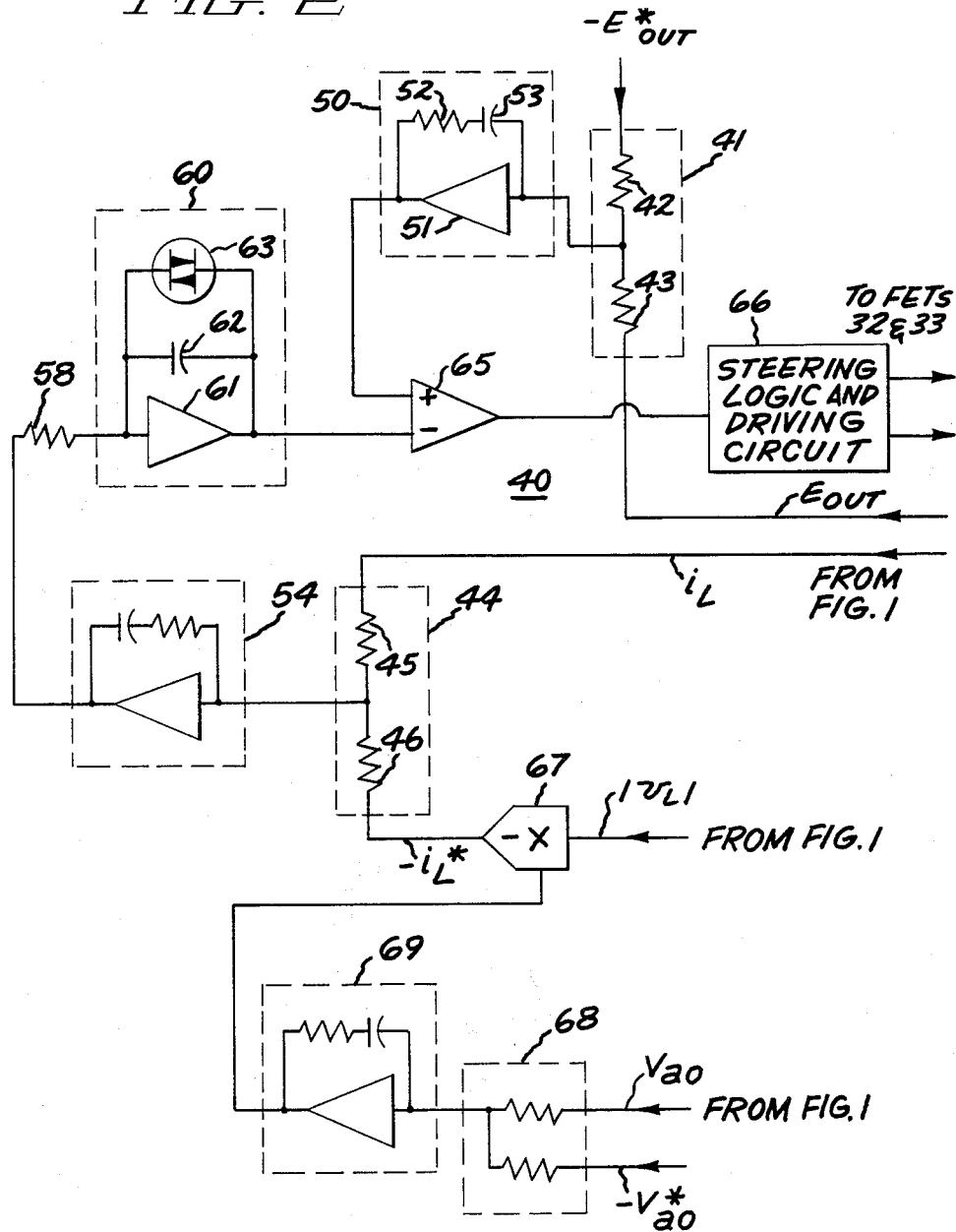

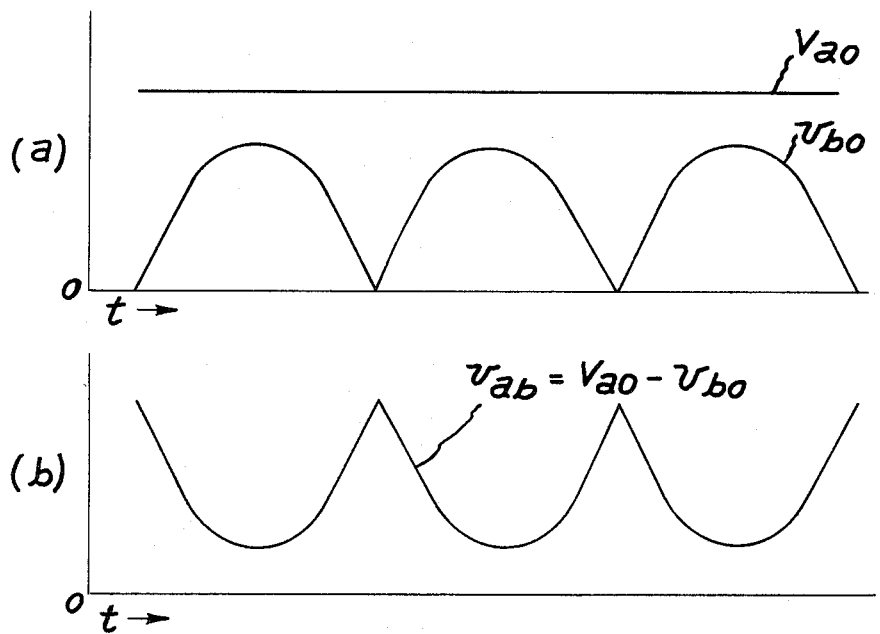
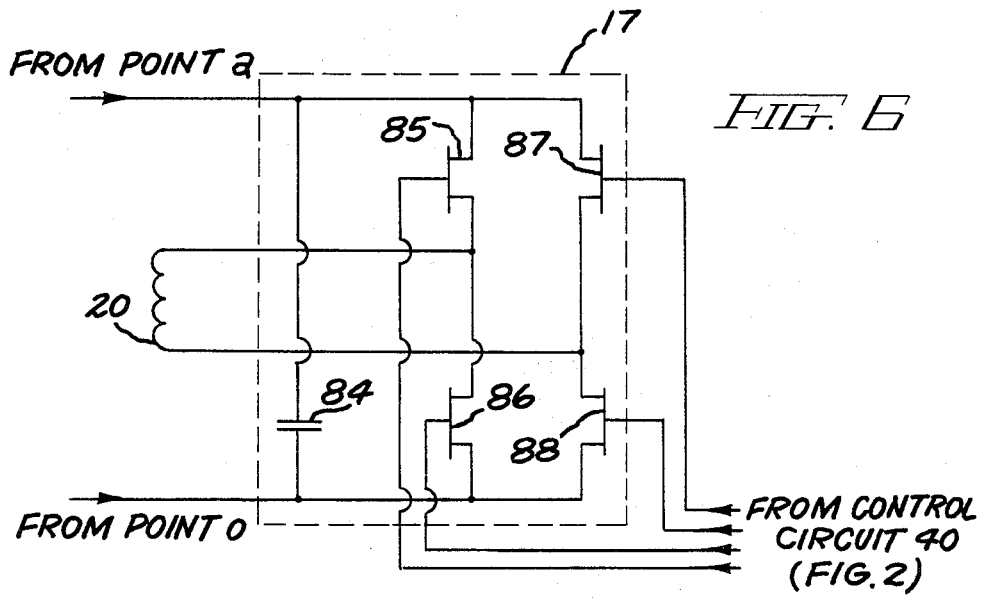

POWER CIRCUIT WITH HIGH INPUT POWER FACTOR AND A REGULATED OUTPUT

BACKGROUND OF THE INVENTION

The present invention relates in general to a power converter having high input power factor which draws low distortion (i.e. very nearly sinusoidal) current from the utility power line, and more specifically to a power converter which independently controls the input current and the output voltage.

Many types of power converters are known for converting a first AC voltage (usually 60 hertz AC voltage from the utility power line) into a second AC voltage or into a DC voltage. Typically, a diode bridge rectifier and a DC capacitive filter are used to convert the AC line voltage to a DC voltage. Switching transistors usually then convert the DC voltage into the second AC voltage which may also then be reconverted to a desired DC output voltage. The current drawn from the AC power line using a rectifier and a DC capacitive filter has high distortion and results in a poor power factor.

One prior art scheme improves power factor by connecting a pair of power converters in series between the AC power line and the load. The two power converters are joined by an energy storage capacitor. The power converter at the input to the AC line is controlled in a manner to draw low distortion current from the AC line in phase with the AC line voltage and provides an intermediate DC voltage on the capacitor. The second power converter takes the intermediate DC voltage and converts it to the regulated power needed at the load. The energy storage capacitor supplies the instantaneous difference in input power and output power. This approach has the disadvantage that two power converters are needed, each with its own expensive power transistors, gate drivers and controls.

Accordingly, it is a principal object of the present invention to provide a power converter which loads the AC line with an apparent resistor so that current distortion is low and power factor is high.

It is a further object of the invention to supply regulated power to a load from a utility frequency AC source while loading the utility line with a near sinusoidal current in phase with the utility voltage using only a single power converter.

SUMMARY OF THE INVENTION

These and other objects are achieved in a power converter comprising AC rectifying means, converting means, a transformer and a resonant capacitor. The AC rectifying means is adapted to be coupled to an AC power line for providing a rectified AC voltage. The converting means has a pair of input terminals coupled to the AC rectifying means and provides an AC signal at its output terminals. The AC signal has a frequency greater than the frequency of the voltage on said AC power line.

The transformer has a primary winding, a closely-coupled secondary output winding and a loosely-coupled secondary boost winding. The primary winding is coupled to the output terminals of the converting means. The boost winding is coupled to the AC rectifying means and to an input of the converting means. The resonant capacitor is coupled to the boost winding. Thus, the input current of the power converter depends on the frequency of the AC signal.

The power converter may further comprise control means coupled to the boost winding, the secondary output winding and the converting means. The control means controls the duty cycle of the AC signal in response to a voltage command. The control means also controls the frequency of the AC signal in a manner to cause the power converter to draw a substantially sinusoidal current from the AC power line in phase with the voltage of the AC power line.

BRIEF DESCRIPTION OF THE DRAWINGS

The novel features of the invention are set forth with particularity in the appended claims. The invention itself, however, as to organization and method of operation, together with further objects and advantages thereof, may best be understood by reference to the following description taken in conjunction with the accompanying drawings in which:

FIG. 2 is a schematic diagram of a control circuit which may used with the power converter of FIG. 1.

FIG. 3(a) and FIG. 3(b) are waveform diagrams for illustrating the operation of the circuit in FIG. 1.

FIG. 6 is a schematic diagram of an alternative embodiment of the converting means of the invention.

DETAILED DESCRIPTION OF THE INVENTION

Figure 1:
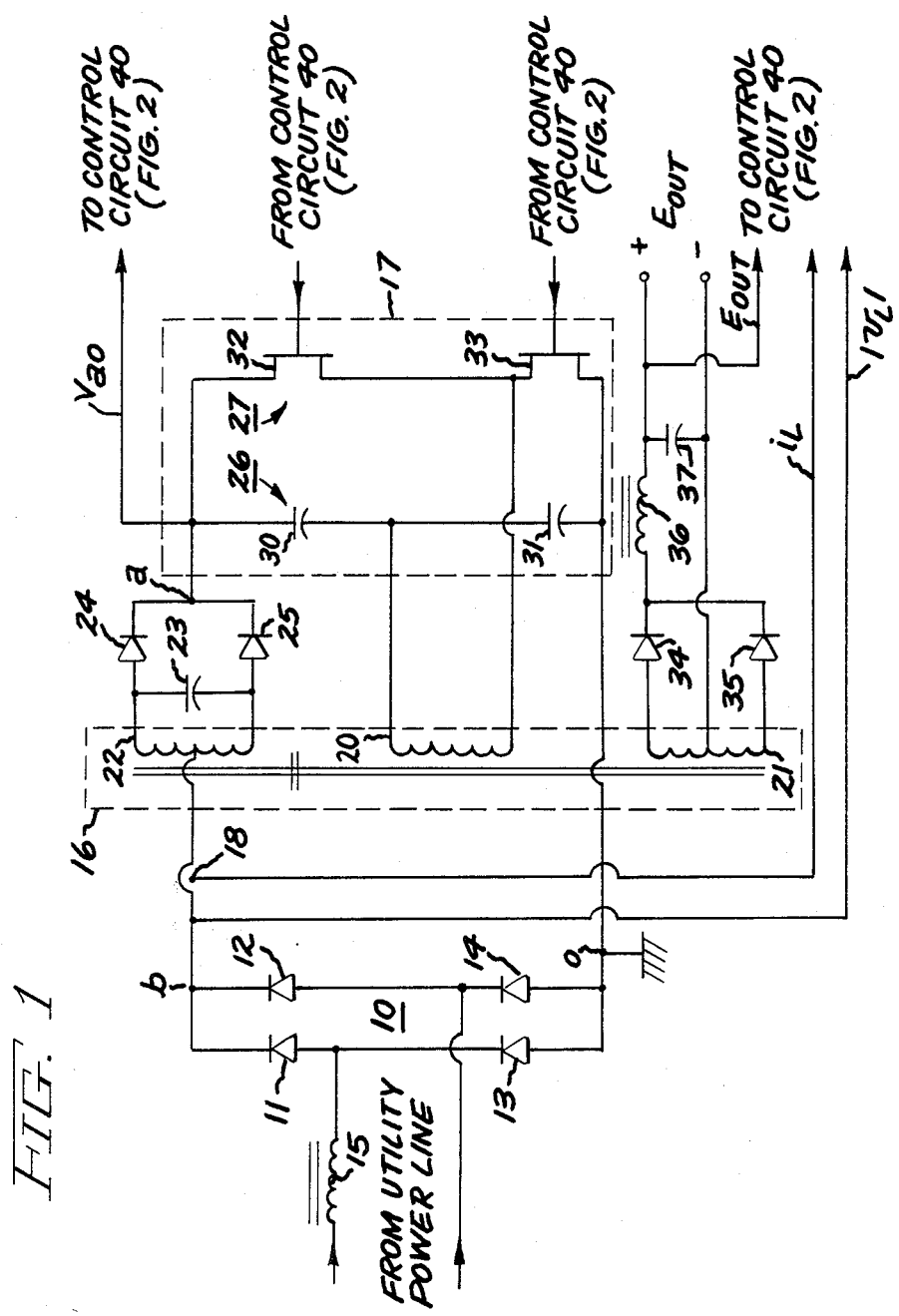
FIG. 1 is a schematic diagram of one embodiment of the power converter of the invention.

Referring now to FIG. 1, an apparatus for converting an AC power line voltage into a regulated DC output voltage $E_{OUT}$ will be described. The apparatus includes a diode bridge rectifier 10 coupled to a utility power line through a high frequency filter inductor 15. AC rectifier 10 includes diodes 11-14 and provides full-wave rectified AC voltage between point b and point o.

A transformer 16 includes a primary winding 20, a secondary output winding 21 and a secondary boost winding 22. Secondary output winding 21 is closely-coupled magnetically with primary winding 20 and secondary boost winding 22 is loosely-coupled magnetically with primary winding 20. Boost winding 22 has an intermediate tap which is coupled to point b and to a current sensor 18. The tight coupling of secondary output winding 21 with primary winding 20 and the loose coupling of secondary boost winding 22 with primary winding 20 allow independent control of the converter's input current and output voltage as will be described belqw.

A resonant capacitor 23 is connected across boost winding 22. A boost rectifier includes a pair of diodes 24 and 25 which have their anodes connected to respective sides of resonant capacitor 23 and have their cathodes connected to a point a.

Point a is connected to a converting means 17 which converts the dc voltage between points a and o to an AC signal which is provided by converting means 17 to primary winding 20. Converting means 17 includes a capacitor means 26 and a voltage inverter means 27. In the embodiment shown in FIG. 1, capacitance means 26 is comprised of a pair of capacitors 30 and 31 connected in series. The junction of capacitors 30 and 31 is connected to one side of primary winding 20. Voltage inverting means 27 is comprised of a pair of field-effect transistors (FETs) 32 and 33. The junction of FETs 32 and 33 is connected to the other side of primary winding 20. The gates of FETs 32 and 33 are connected to a control circuit 40 which will be described with reference to FIG. 2. Thus, converting means 17 is shown in FIG. 1 as a half-bridge inverter which may be employed to provide an AC signal having a variable frequency and a variable duty cycle to primary winding 20 by alternately turning on and off FETs 32 and 33.

Current flow in primary winding 20 creates voltages across secondary windings 21 and 22. The voltage across secondary output winding 21 is rectified by a pair of diodes 34 and 35. The rectified output signal from diodes 34 and 35 is smoothed by an output filter inductor 36 and an output capacitor 37. DC output voltage $E_{OUT}$ is provided across capacitor 37. Since secondary output winding 21 is tightly coupled to primary winding 20, DC output voltage $E_{OUT}$ is controlled by pulse-width modulation of the duty ratio of the AC signal provided to primary winding 20 and is substantially independent of the frequency of the AC signal. The duty cycle controls the current in the output winding and thus the voltage generated across the output capacitor.

The loose coupling between primary winding 20 and secondary boost winding 22 introduces a predetermined amount of leakage inductance. The leakage inductance of boost winding 22 resonates with capacitor 23 so that the voltage across capacitor 23 is a function of the damping of the resonant circuit and both the frequency and the duty cycle of the AC signal supplied to primary winding 20. The voltage appearing across capacitor 23 is rectified by diodes 24 and 25 such that a boost voltage $v_{ab}$ is produced between points a and b. Boost voltage $v_{ab}$ may be controlled such that the power converter draws a sinusoidal current in phase with the voltage of the AC power line.

The input current to the power converter is measured by current sensor 18 which generates a current signal $i_L$ which is provided to the control circuit. The rectified input voltage $|v_L|$ is provided to the control circuit, as are the DC output voltage $E_{OUT}$ and the DC bus voltage $V_{ao}$.

Before proceeding with the description of the control circuit in FIG. 2, the preferred operation of the power converter of FIG. 1 will be described in more detail with reference to the waveforms of FIG. 3. FIG. 3(a) shows the DC voltage $V_{ao}$ between points a and o and shows the rectified AC voltage $v_{bo}$ between points b and o. The boost winding and the resonant capacitor of the present invention can be considered as an adjustable voltage generator for providing the difference between the voltages shown in FIG. 3(a). This difference is the boost voltage $v_{ab}$ and preferably takes the form shown in FIG. 3(b). The resulting current drawn from the utility power line may then be commanded to be in phase with the utility line voltage as described below. As is apparent from the waveform of FIG. 3(b), the power delivered by the resonant circuit is considerably less than the power from AC rectifier 10 because the resonant circuit is supplying only a small boost voltage at the line power peaks rather than a full DC voltage.

FIG. 2 is a schematic diagram of a control circuit 40 for achieving the operation of the power converter as described above. DC output voltage $E_{OUT}$ is supplied from the power converter of FIG. 1 to a summing means 41. An externally supplied voltage command $-E^*_{OUT}$ is also coupled to summing means 41. Summing means 41 may, for example, comprise a pair of resistors 42 and 43. Thus, the output signal of summing means 41 will be proportional to the error between the actual output voltage $E_{OUT}$ and the desired output voltage $E^*_{OUT}$. The output of summing means 41 is connected to the input of a compensator gain block 50 shown as a proportional-and-integral (P&I) controller. The P&I controller is a commercially standard device and is shown to include an operational amplifier 51, a resistor 52 and a capacitor 53. The output of compensator gain block 50 is connected to the non-inverting input of a comparator 65. Compensator gain block 50 may alternatively comprise a lead-lag compensator.

Current signal $i_L$ from current sensor 18 (FIG. 1) is coupled to a summing means 44. Rectified AC voltage signal $|v_L|$ is supplied to one input of a voltage multiplier 67 which generates the negative of the product of two input voltages. As a consequence, the output signal of multiplier 67 is a current command signal $-i^*_L$ which is in phase with the utility line voltage. The amplitude of current command $-i^*_L$ is controlled in order to match the input power flowing to the power converter with the output power supplied to the load. This is achieved by regulating the voltage $V_{ao}$ across the converting means. Thus, a DC bus voltage command $-V^*_{ao}$ is provided to one input of a summing means 68 and the actual voltage $V_{ao}$ is provided to the other input of summing means 68. The output signal of summing means 68 is coupled to a compensator gain block 69. By providing the output signal of gain block 69 to the remaining input of multiplier 67, the current command signal $-i^*_L$ is scaled to a level which maintains the desired bus voltage $V_{ao}$ (i.e. to a level above peak line voltage). Voltage commands $-E^*_{OUT}$ and $-V^*_{ao}$ can be provided by circuits comprising auxiliary voltage sources and combinations of resistors and/or zener diodes, as is known in the art.

The current command signal $-i^*_L$ is supplied to summing means 44, comprised of resistors 45 and 46. The output of summing means 44 is coupled to a compensator gain block 54 similar in circuitry to compensator gain block 50. The output of compensator gain block 54 is coupled to a ramp generator 60 through a resistor 58. Ramp generator 60 generates a variable frequency ramp signal having a constant peak amplitude but variable rising-edge slope in accordance with the output of compensator gain block 54. Ramp generator 60 may comprise the parallel connection of an operational amplifier 61, a capacitor 62 and a diac 63, for example. The variable ramp signal is coupled to the inverting input of comparator 65. The output signal of comparator 65 has a variable frequency and a variable duty cycle and is used to derive switching signals for converting means 17, of FIG. 1, by a steering logic and driving circuit 66. Circuit 66 provides a pair of output signals for driving FETs 32 and 33 of FIG. 1. Circuit 66 could be comprised, for example, of flip-flops (e.g. toggle flip-flops) coupled to the output of ramp generator 60 for generating switching signals, and comprised of amplifiers, transformers or level-shifters, if necessary, for driving the converter FETs, all as is well known in the art.

In operation, ramp generator 60 provides a ramp signal having a frequency greater than the utility line frequency and preferably greater than the resonant frequency of the boost winding and the resonant capacitor. Comparator 65 provides a square-wave output signal having the frequency of the ramp signal and having a duty cycle determined by the output signal of compensator gain block 50. Any error between the commanded DC output voltage and the actual DC output voltage is detected by summing means 41 and compensator gain block 50 and the duty cycle of the output signal from comparator 65 is corrected accordingly. Compensator gain block 54 detects the difference between actual current into the power converter and the desired current in phase with the utility line voltage represented by current command $i^*_L$. Any error thus changes the frequency of ramp generator 60.

Figure 4:
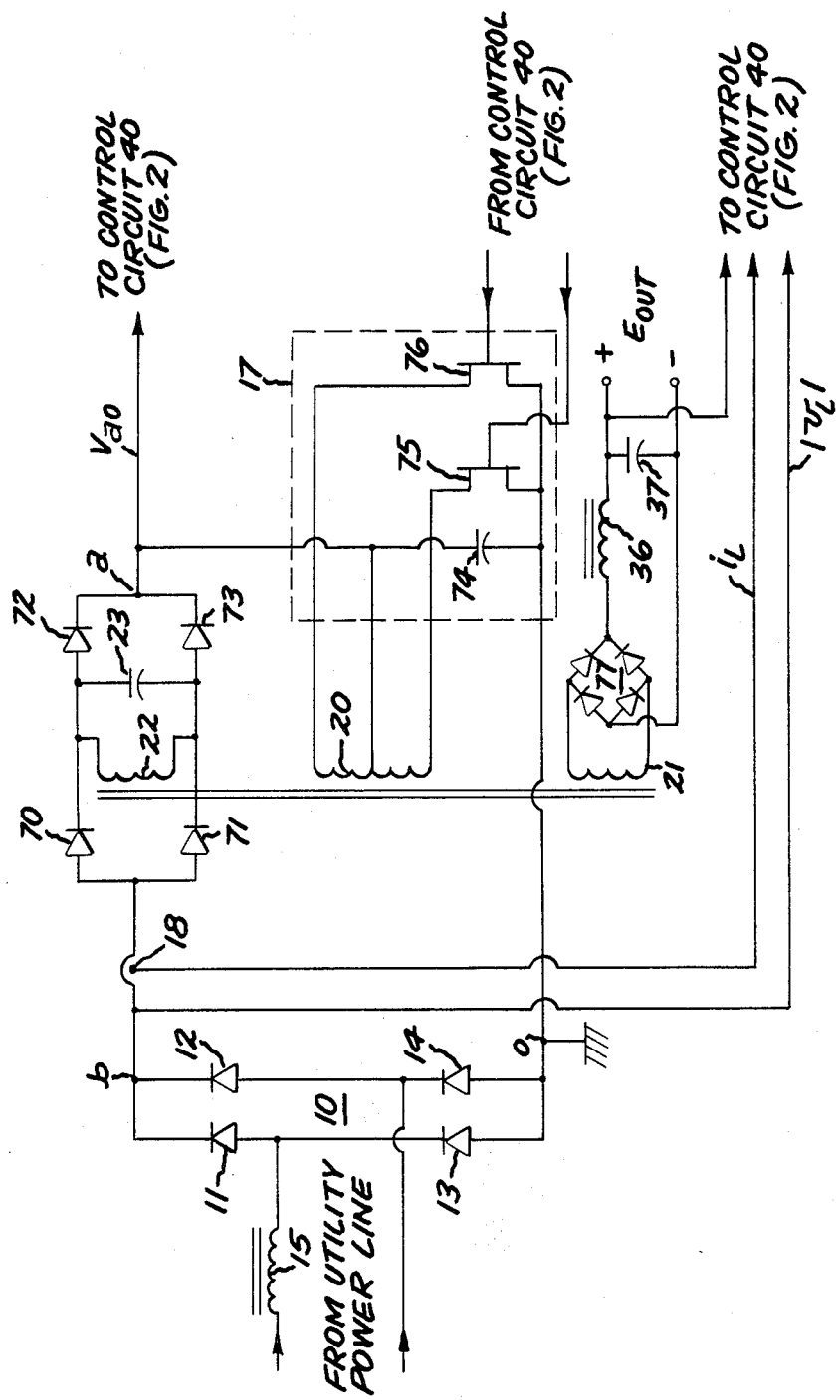
FIG. 4 is a schematic diagram of an alternative embodiment of the power converter of the invention.

An alternative embodiment of the power converter of the present invention is shown in FIG. 4. Converting means 17 is shown as a push-pull power circuit, including a capacitor 74 and a voltage inverter means including FETs 75 and 76. Primary winding 20 includes an intermediate tap connected to capacitor 74 and has each end connected to a respective FET.

Alternative embodiments for secondary windings 21 and 22 not requiring intermediate taps are also shown in FIG. 4. Thus, secondary output winding 21 is connected to a diode bridge rectifier 77 whereby the voltage from output winding 21 is rectified without the need for an intermediate tap. Similarly, secondary boost winding 22 is connected to a diode bridge rectifier including diodes 70–73.

Figure 5:
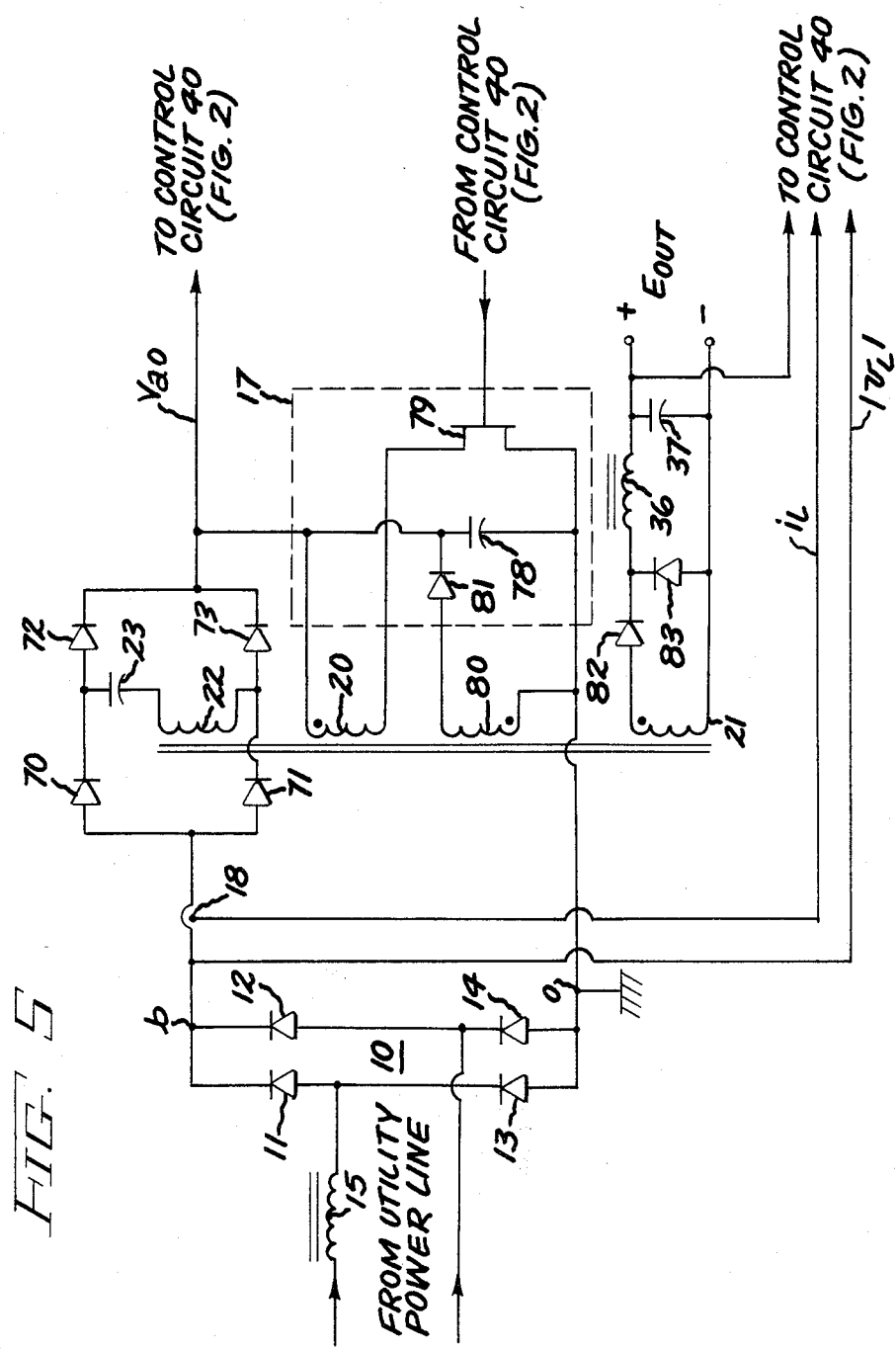
FIG. 5 is another alternative embodiment of the invention.

Further possible circuit modifications are illustrated in FIG. 5. Converter means 17 is shown as a single-ended power circuit employing a capacitor 78, a FET 79 and a diode 81. A reset winding 80 is included in the transformer, allowing for conventional operation of the single-ended power circuit. Secondary output winding 21 is coupled to a pair of diodes 82 and 83 for operating with a single-ended power circuit in conventional manner.

Also shown, in FIG. 5 is the placement of resonant capacitor 23 in series with secondary boost winding 22. Thus, boost voltage $v_{ab}$ is alternatively provided by a series resonant circuit.

FIG. 6 illustrates yet another alternative embodiment for converting means 17. A capacitor 84 is connected between points a and o. A full-bridge voltage inverter is coupled across capacitor 84 and includes FETs 85–88.

Figure 7:
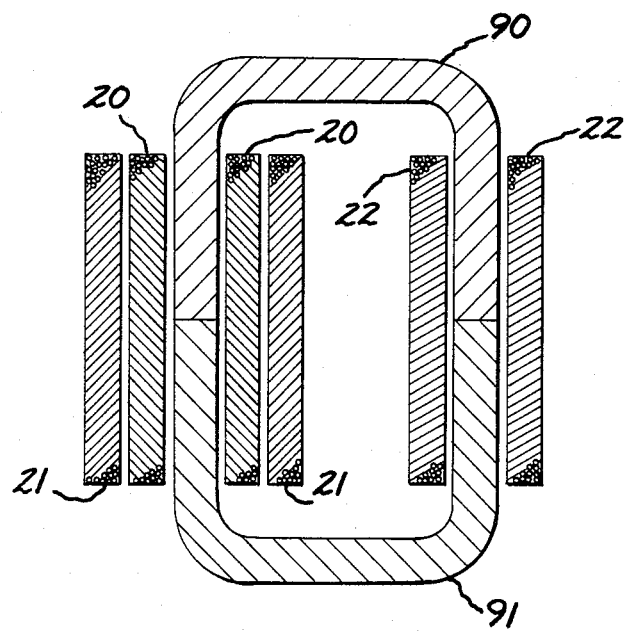
FIG. 7 is a cross-sectional view of a transformer which may be employed in practicing the present invention.

FIG. 7 shows an exemplary construction for transformer 16. A split-C core comprised of core half 90 and core half 91 has primary winding 20 and secondary output winding 21 wound on one leg. Secondary boost winding 22 is wound alone on the other leg of the core in order to establish the desired leakage inductance.

The foregoing has described a power converter which loads the AC line with an apparent resistor so that current distortion is low and power factor is high. Regulated power is supplied to a load from a utility frequency AC source while loading the utility line with a near sinusoidal current in phase with the utility while using only a single power converter. Independent control of input current and output voltage is achieved using a transformer having a primary winding and two secondary windings.

While preferred embodiments of the present invention have been shown and described herein, it will obvious that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A power converter comprising:
   AC rectifying means adapted to be coupled to an AC power line for providing a rectified AC voltage;
   converting means having a pair of input terminals coupled to said AC rectifying means, said converting means providing an AC signal at its output terminals, said AC signal having a frequency greater than the frequency of the voltage on said AC power line;
   a transformer having a primary winding, a closely-coupled secondary output winding and a loosely-coupled secondary boost winding, said primary winding being coupled to the output terminals of said converting means, said boost winding being coupled to said AC rectifying means and to one of said input terminals of said converting means; and
   a resonant capacitor coupled to said boost winding;
   whereby the input current amplitude of said power converter depends on the frequency of said AC signal.

2. The power converter of claim 1 further comprising control means coupled to said boost winding, said secondary output winding and said converting means for controlling the duty cycle of said AC signal in response to a voltage command, and for controlling the frequency of said AC signal in a manner to cause said power converter to draw a substantially sinusoidal current from said AC power line in phase with the voltage of said AC power line.

3. The power converter of claim 1 wherein said boost winding includes an intermediate tap, said intermediate tap being connected to said AC rectifying means, and said power converter further comprising a boost rectifier coupled to said boost winding and to said resonant capacitor.

4. The power converter of claim 3 wherein said resonant capacitor is connected in parallel with said boost winding for providing a parallel-resonant circuit.

5. The power converter of claim 1 wherein said resonant capacitor is connected in series with said boost winding.

6. The power converter of claim 1 wherein said AC rectifying means comprises a diode bridge.

7. The power converter of claim 6 further comprising an input inductor for connecting in series between said AC rectifying means and said AC power line.

8. The power converter of claim 1 further comprising output circuit means coupled to said secondary output winding for providing a DC output voltage.

9. The power converter of claim 1 wherein said converting means comprises a half-bridge inverter.

10. The power converter of claim 1 wherein said converting means comprises a full-bridge inverter.

11. The power converter of claim 1 wherein said primary winding includes a center tap and wherein said converting means comprises a push-pull inverter.

12. The power converter of claim 1 wherein said transformer further comprises a reset winding and wherein said converting means comprises a single-ended inverter.

13. A power converter comprising:

AC rectifying means for providing a rectified AC voltage, said AC rectifying means having input terminals adapted to be coupled to an AC power line and having a positive output terminal and a negative output terminal;

capacitance means coupled to said positive output terminal and said negative output terminal of said AC rectifying means for providing a first DC voltage thereacross;

voltage inverter means coupled to said capacitance means for inverting said DC voltage to an AC signal;

a primary winding coupled to said capacitance means and to said voltage inverter means so as to receive said AC signal;

a boost winding coupled between said AC rectifying means and said capacitance means, said boost winding being loosely-coupled magnetically to said primary winding;

a resonant capacitor coupled to said boost winding;

a boost rectifier coupled to said boost winding and to said resonant capacitor, said boost rectifier providing a boost voltage to said capacitance means;

a secondary output winding closely-coupled magnetically to said primary winding; and output circuit means coupled to said secondary output winding for providing a DC output voltage.

14. The power converter of claim 13 further comprising control means coupled to said boost winding, said secondary output winding and said voltage inverter means for controlling the duty cycle of said AC signal in response to a voltage command, and for controlling the frequency of said AC signal in a manner to cause said power converter to draw a substantially sinusoidal current from said AC power line in phase with the voltage of said AC power line.

15. The power converter of claim 14 wherein said control means further includes circuit means for regulating said first DC voltage at a predetermined level.

16. The power converter of claim 14 further comprising a current sensor coupled to said boost winding and to said control means, said current sensor providing a signal to said control means proportional to current in said boost winding.

* * * * *